UNITED STATES PATENT OFFICE.

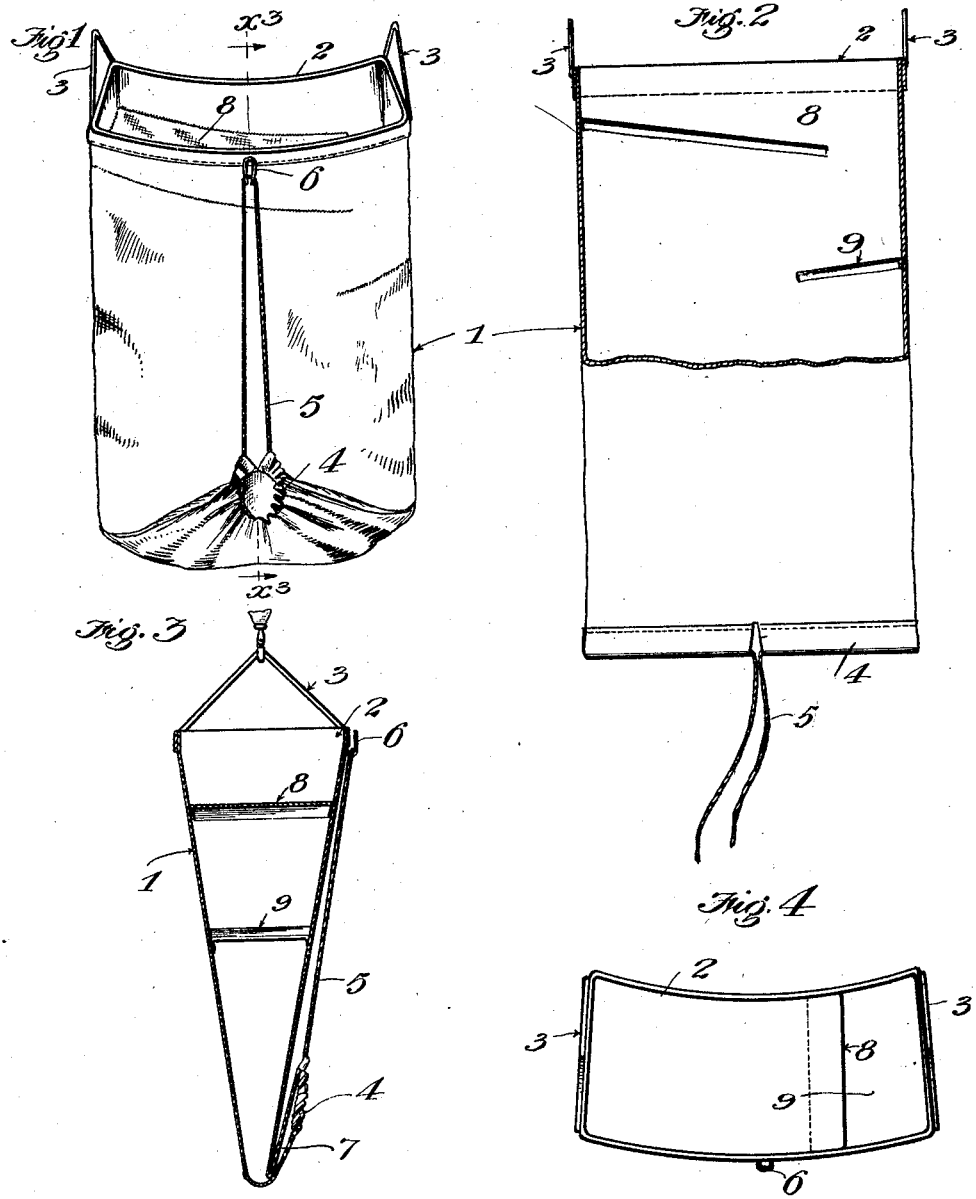

EDWIN J. GRANT, OF LOS ANGELES, CALIFORNIA.

FRUIT-PICKER'S BAG.

No. 929,209.

Specification of Letters Patent.

Patented July 27, 1909.

Application filed May 4, 1904. Serial No. 206,271.

*To all whom it may concern:*

Be it known that I, EDWIN J. GRANT, a citizen of the United States, residing at Los Angeles, in the county of Los Angeles and State of California, have invented new and useful Improvements in Fruit-Pickers' Bags, of which the following is a specification.

One object of the present invention is to provide an improved fruit picker's bag adapted to prevent bruising or damaging of the fruit by its being carelessly dropped into the bag.

To this end, the invention comprises means which obstruct the passage of the fruit downwardly into the bag so as to prevent it from falling to the bottom of the bag or against the fruit already therein, with such force as to cause injury thereto and in this connection a special object of my invention is to provide means whereby this protective result may be produced, no matter where the fruit may be thrown into the bag.

My invention is particularly intended for use with the class of bags now in use for picking oranges and similar fruits and provided with closure means at their lower ends, which are held closed during the picking of fruit by suitable retaining means and which when said retaining means are released will open automatically under the weight of the fruit and allow the same to be discharged at the bottom of the bag.

The accompanying drawings illustrate the invention.

Figure 1 is a perspective of the bag showing the closure device in closed position. Fig. 2 is a front elevation of the bag in open position, the upper part being broken away to show the dashers or obstructing devices. Fig. 3 is a vertical section on the line $x^3$—$x^3$ in Fig. 1. Fig. 4 is a plan of the bag.

The bag consists of a tubular body 1 of any suitable fabric, and may be provided at its upper end with the usual mouth 2, and suspensory devices 3. At its lower end the bag is provided with a closure means consisting of a flexible gathering device for drawing the lower end of the bag together. For this purpose the lower end of the bag may be turned up and sewed on itself to form a fold, loop or doubled part 4, and a cord or other flexible connection 5 be passed through said fold or doubled part with its ends extending therefrom and fastened together to form a loop suitable for hooking over the retaining hook 6 at the top of the bag. By drawing on said cord the lower end of the bag can be gathered up and closed, as indicated in Figs. 1 and 3, and the cord then being looped over the hook 6, the bottom end of the bag will be folded, doubled or drawn up alongside the adjacent portion of the bag as at 7, so that when the fruit is placed in the bag its weight will tend to tighten said cord and close the discharge end thereof more tightly.

At or near the upper end or mouth of the bag I provide an apron 8 consisting of a piece of canvas or other suitable yielding, flexible fabric or material, which is sewed or otherwise fastened to the sides of the bag. Said apron is adjacent throughout its length to the mouth of the bag and extends substantially across the bag, from one side of the bag to near the other side of the bag, leaving, however, a sufficient space or opening between said other end of the bag and the apron to allow the fruit to pass therebetween. Below this opening is provided a dasher or obstructing device 9, which is sufficient in length to catch the fruit falling through said opening.

By constructing a bag in the foregoing manner an elongated body is formed having its upper end permanently open and provided with means which will permit of the introduction of fruit with rapidity and without the danger of bruising it, and the lower end is closable by a continuous loop that is held by a hook at the open end in convenient reach of the operator when the bag is to be emptied. The main portion of the bag is unobstructed and can be filled as easily as though the partitions were not present.

What I claim is—

A fruit gathering bag comprising an elongated, open ended, tubular body, one end of which is folded upon itself to form a hollow seam provided with an opening; a continuous string or loop in said seam with a portion extending out of said opening, whereby said end of the body may be closed by drawing upon said extended portion, a rigid frame secured in the other end of the body to hold it permanently open, a hook at said open end to be engaged by the projecting portion of said loop when the bag is closed, and two flexible partitions in said bag, one of which is longer than the other and is located near the permanently open end and extends from one side across the body in a plane almost parallel with said frame nearly to the opposite side, and the shorter partition is located a short distance below the lower end of the longer partition and extends a short distance under the free end of said longer partition.

In testimony whereof I have hereunto signed my name to this specification in the presence of two subscribing witnesses, at Los Angeles, in the county of Los Angeles and State of California, this 25th day of April 1904.

EDWIN J. GRANT.

Witnesses:
ARTHUR P. KNIGHT,
JULIA TOWNSEND.